Jan. 10, 1956  P. DARGIER DE SAINT-VAULRY  2,730,634
ELECTRICAL BALANCE WHEEL FOR TIME-KEEPERS
Filed July 3, 1953

Inventor
P. D. de Saint-Vaulry
By Glascock Downing Heebold
Attys.

United States Patent Office 2,730,634
Patented Jan. 10, 1956

2,730,634

ELECTRICAL BALANCE WHEEL FOR TIME-KEEPERS

Paul Dargier de Saint-Vaulry, Byans-sur-le-Doubs, France, assignor to Lip S. A. D'Horlogerie, Besancon, France Application July 3, 1953, Serial No. 366,009

Claims priority, application France July 9, 1952

1 Claim. (Cl. 310—39)

In electrical time-keepers provided with a circular balance wheel the motion of which is kept up by electromagnetic action acting directly on the wheel, the latter, as is known, is subjected to a disturbing torque due to the remanence or polarization of the magnetic circuit so that the isochronism of the oscillations is affected.

This drawback is remedied according to the present invention by applying a variable magnetic torque to the balance wheel so as to oppose the disturbing torque and neutralise it.

One embodiment of the invention is illustrated in the accompanying drawing.

Figure 1:
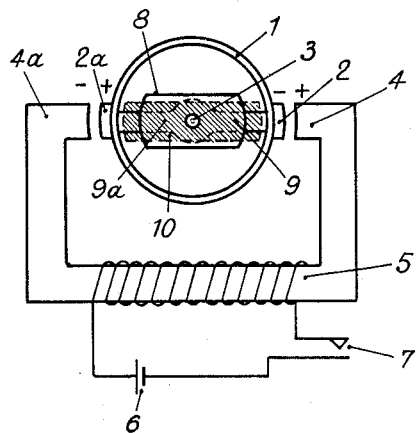
Fig. 1 is a view showing the balance wheel and the parts or elements concerned in the invention.

The balance wheel 1 consists of a circular ring, as shown in Fig. 1, provided with two salient parts 2 and 2a. It is adapted to turn about a pivot 3 between the poles 4 and 4a of an electro-magnet 5 energized from a battery 6 by means of a contact 7, shown diagrammatically.

Switch 7 may be operated in different manners, for instance by means of the oscillating movement of balance wheel 1 in such a way that the circuit energizing electro-magnet 5 is closed and opened at suitable times.

Owing to the remanence or polarization of the magnetic circuit formed by the electro-magnet 5 and the balance wheel 1, the latter tends to move into the position of maximum flux or the position shown in Fig. 1, when the circuit of electro-magnet 5 is closed. Balance wheel 1 is engaged by a spiral coiled spring (not shown) tending to move the same in such a way that said balance pivots into a position perpendicular to that determined by the magnetic field, for instance into the position shown in Fig. 1 and for the polarities such as labelled.

When the balance wheel during its oscillating movement owing to the combined actions of the spiral coiled spring and the magnetic field, arrives in a different position, it finds itself under the action of a disturbing torque tending to return it into the nearest position of the maximum flux.

Figure 2:
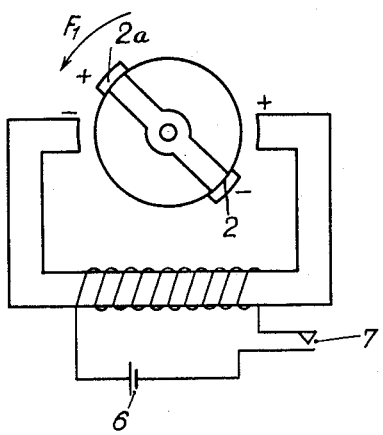
Figs. 2 and 3 are diagrammatic views illustrating the actions of the disturbing torque.
Figure 3:
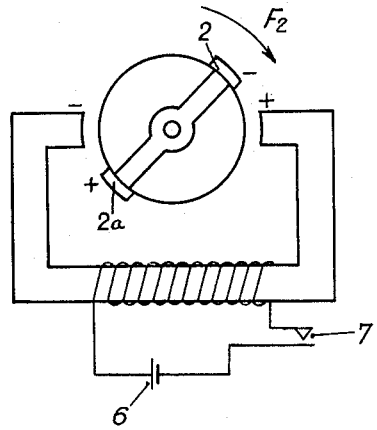
Figure 4:
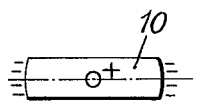
Fig. 4 is a plan view of the moving permanent magnet shown in Fig. 1.
Figure 5:
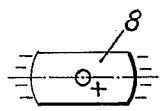
Fig. 5 is a plan view of the fixed permanent magnet shown in Fig. 1 and used in combination therewith.

For instance, in the position shown in Fig. 2, this disturbing torque tends to turn the balance wheel 1 in the direction of the arrow $F_1$ while in the position shown in Fig. 3 it tends to turn the balance wheel in the direction of the arrow $F_2$.

This action is neutralized, according to the present invention, by fixing a permanent magnet 8 on to the balance wheel 1 perpendicular to its axis 3. The magnet in question is of the concentric magnetization type and turns with the balance wheel and is provided with a pole at its centre situated at the axis 3, the other pole being distributed at its ends 9 and 9a.

The field of this magnet reacts with that of a fixed magnet 10, shown in dotted lines and hatched, this magnet also being of the concentric magnetization type and of the same polarity as the magnet 8 but not turning. The action of the field produced by the turning magnet 8 on the field produced by the fixed magnet 10 tends to cancel the attraction of the salient pieces 2 and 2a of the balance wheel 1 by the poles 4 and 4a of the polarized electro-magnet 5 and consequently the disturbing torque resulting from this attraction.

The turning magnet 8 and the fixed magnet 10 may consist of one piece or several pieces separately magnetized.

The basic idea of the invention is in the combination of a turning magnet and a fixed magnet, or one which does not turn.

I claim:

A balance wheel for an electric time-keeper subjected to the action of a magnetic field designed to maintain the oscillating movement of said balance wheel, a permanent magnet of the concentric magnetization type being supported by said balance wheel and pivoting therewith, said permanent magnet cooperating with another permanent magnet also of the concentric magnetization type, said permanent magnets being disposed in such a way that their action on each other during the rotation of the moving permanent magnet together with said balance wheel produces a torque which neutralizes the disturbing torque acting on said balance wheel during the rotation thereof and due to the remanence or polarization of the electro-magnetic maintaining circuit.

References Cited in the file of this patent

UNITED STATES PATENTS 2,598,912    Held _____ June 3, 1952